United States Patent Office 2,829,183
Patented Apr. 1, 1958

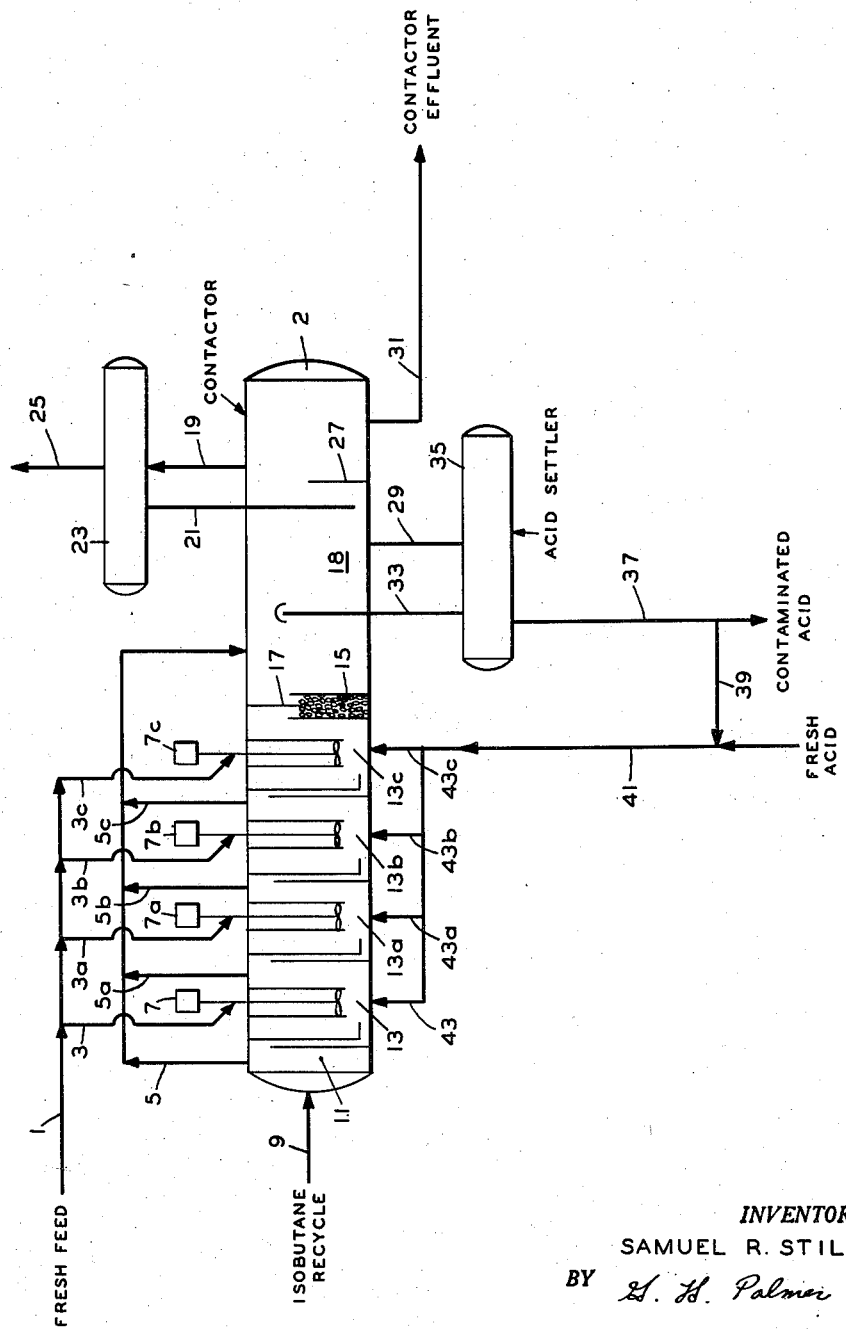

2,829,183

ALKYLATION OF HYDROCARBONS

Samuel R. Stiles, Cresskill, N. J., assignor to The M. W. Kellogg Company, Jersey City, N. J., a corporation of New Jersey Application September 8, 1954, Serial No. 454,676

6 Claims. (Cl. 260—683.15)

This invention relates to an alkylation process and more particularly, to the alkylation of isoparaffins with olefins in the presence of an acid catalyst. Still more particularly, it relates to the reduction of acid catalyst contamination in the alkylation of isoparaffins with olefins.

The alkylation of isoparaffins with olefins is characterized by the formation, not only of compounds resulting from the combination of the saturated and unsaturated carbon molecules, that is, alkylate, but also by the formation of olefin copolymers which vary greatly in molecular weight. These polymers are to be differentiated from the compounds frequently grouped together under the term "polymer" which are produced in the alkylation reaction and which are soluble in the acid catalyst. In this latter group are included esters and unsaturated hydrocarbons. The term "polymer" as used herein is intended to include those compounds which are miscible in the hydrocarbon effluent from the alkylation zone but are essentially immiscible in the acid catalyst.

In the usual alkylation reaction polymerization of the olefin reactant is repressed by operating within narrow ranges of temperature and acid concentration and by carrying out the reaction in such a manner that the olefins are contacted with a large excess of isoparaffins, the reactants and catalyst being maintained in a highly turbulent state. This method of operation is successful in controlling polymer formation but it provides an undesirable situation with respect to the separation of polymers from the acid catalyst. Although the polymers and acid are immiscible, their separation is usually slow, particularly in the case of the heavier polymers, since the separation is normally accomplished by gravity difference alone. The closer that the polymers approach the acid in gravity the less likelihood there is that separation will be effected in the relatively short residence time provided in the conventional alkylation contactor. As a result the acid leaving the contactor is contaminated with polymers which are preferably retained in the hydrocarbon yield.

Acid used in the alkylation reaction must be maintained at a high concentration in order to retain its effectiveness as a catalyst. Inasmuch as the acid catalyst contains active catalyst compounds as well as contaminants, the interests of economy dictate the reuse of catalyst recovered from the alkylation contactor. Therefore it is desirable to restrict the degree to which this stream is contaminated. A method of operation which successfully accomplishes this will not only increase the concentration of acid leaving the contactor, which will decrease acid consumption and lower the cost of acid purification, but will also eliminate recycle and buildup of polymers in the alkylation contactor.

It is an object of this invention to provide an improved process for the alkylation of hydrocarbons in the presence of an acid catalyst.

It is another object of this invention to provide an improved method of separating contaminants from an alkylation acid catalyst.

Another object of this invention is to decrease acid consumption in the alkylation of hydrocarbons in the presence of an acid catalyst.

Still another object of this invention is to decrease contamination of an acid catalyst used to promote hydrocarbon alkylation.

Yet another object of this invention is to decrease polymer recycle and buildup in a reaction zone for the alkylation of hydrocarbons in the presence of an acid catalyst.

These and other objects of the invention will become more apparent from the following detailed discussion and description.

In one aspect of this invention hydrocarbon polymers formed in an alkylation reaction zone are separated from contaminated alkylation acid catalyst in a settling zone and are returned to the reaction zone.

In another aspect of the invention the temperature in the settling zone is increased to aid in the separation of polymers by decreasing the viscosity of the acid and to increase polymer recovery and decrease acid contamination by decomposition of thermally unstable acid-hydrocarbon esters.

In the commercial alkylation of low boiling isoparaffins with olefins it is customary to utilize feed stocks varying widely in composition and containing a large variety of saturated and unsaturated compounds. For example, either cracked or straight run refinery gases which are a prime source of alkylation feed stocks may contain paraffins having from 1 to 6 carbon atoms, isoparaffins including isobutane, isopentane and others of higher molecular weight and numerous low boiling olefins and their isomers. It is within the scope of this invention to use feed stocks containing these low boiling compounds in widely varying proportions.

The alkylation reaction takes place over a wide range of temperature and pressure varying from about 0° F. to as high as about 400° F. and between about atmospheric pressure and about 1000 p. s. i. g. This invention finds particular use in alkylation reactions promoted by a sulfuric acid catalyst, however, similar results are obtained when other acid catalysts which promote the formation of polymers are used, for example, hydrofluoric acid and phosphoric acid. Of particular commercial interest in the alkylation field is the reaction of isobutane with butylene in the presence of sulfuric acid. The subsequent discussion will be directed to this process, however, this is not to be construed as restricting the scope of the invention.

The sulfuric acid alkylation of isobutane with butylene is preferably conducted in several stages and at a temperature between about 0° F. and about 100° F. The pressure in the reaction zone is maintained at a level sufficient to keep the reactants in a liquid state, usually between about atmospheric and about 100 p. s. i. g. In order to obtain a high quality alkylate it is desirable to maintain a high isobutane to olefin ratio in the reaction zone, preferably between about 100 and about 1000 mols per mol and it is necessary to keep the acid catalyst strength above 80%, and preferably above 90%.

In a typical application of this invention isobutane and sulfuric acid are introduced into an alkylation reaction zone and are violently agitated to form an emulsion, this being the preferred method of assuring intimate contact between the acid catalyst and the hydrocarbon to be alkylated. The major portion of the isobutane feed is provided by a recycle stream obtained from subsequent distillation steps. Any additional quantity of isobutane required, for example, that amount needed to start up the unit is usually supplied from an independent source. The mixing and agitation required in the contact zone may be provided in a number of ways, however, usually a conventional mixer or pump provides a means for creating and moving the emulsion at high velocity and also for circulating the emulsion in the contact zone. The reaction may be carried out in one stage although more usually several stages in series are provided with a portion of the olefin reactant being admitted to each stage and contacting isobutane passing serially through the successive stages. The alkylation feed which contains the olefin reactant also contains isobutane, butane, propane and frequently small quantities of lighter paraffins. The temperature in the reaction zone is maintained at a constant low level by vaporizing therefrom the lighter components in the reaction products, more usually, a mixture of butane, isobutane, propane and any lower boiling compounds. The vapors are compressed and condensed and the condensate after the removal of propane and lighter components is returned to the alkylation reaction zone in the isobutane recycle. The material leaving the last reaction stage, comprising a mixture of alkylate, acid, unreacted hydrocarbons and olefin polymers of varying molecular weight and density, is passed through a demulsifying zone and from there into a separation zone wherein a major portion of the hydrocarbons, including the lighter polymers, are separated from the acid catalyst. The residence time of the reaction zone effluent in the separation zone is between about 10 minutes and about 120 minutes, more usually, between about 30 minutes and about 60 minutes. Because of the large quantity of material passing through the alkylation contactor, increasing the size of the separation zone has little effect on the degree of polymer separation. This is readily apparent when it is considered that for each additional volume provided for acid separation it is necessary to provide between about 6 and about 15 volumes for the hydrocarbon effluent from the reaction stages. To overcome this difficulty and provide a practical method of separating the polymers ordinarily retained in the acid catalyst a second separation or settling zone is provided into which the polymer contaminated acid is passed from the main separation zone in the alkylation contactor. Since this settling zone does not have to accommodate the hydrocarbon material previously separated from the acid it is possible to provide therein a settling time substantially greater than exists in the first separation zone, that is, between about 60 minutes and about 200 minutes within a space having between about ⅛ and about ⅓ times the volume of the first separation zone. The polymers which separate from the spent acid in the settling zone rise to the top of the settler by reason of their lower density and are returned to the first separation zone. A portion of the substantially polymer-free acid is recycled to the reaction zone and the remainder is either purified for reuse, used in another process where a high degree of purity is not required or is discarded.

One of the difficulties in separating heavier polymers from the acid lies in the fact that the acid is very viscous at the temperature prevailing in the alkylation contactor. Once the acid-hydrocarbon mixture is passed from the reaction zones it is no longer necessary to maintain a low temperature and, as a matter of fact, separation of polymers from the acid is promoted by increasing the temperature. After the contaminated acid is withdrawn from the contactor the temperature may be easily increased without affecting the operation of the contactor. This increase is brought about either by heat transfer from the atmosphere or, to provide a quicker and greater temperature rise, a jacket or coil, heated by steam or other heat exchange material, is supplied in conjunction with the settling zone. Whichever means is used, heating the contaminated acid to a temperature above the contactor temperature but not above about 90° F. decreases the acid viscosity and allows the polymers to more rapidly escape from the acid.

In addition to polymers quantities of acid-hydrocarbon esters are formed in the alkylation reaction zone. As mentioned before these materials are soluble in the acid and they therefore contribute to the catalyst contamination. Fortunately many of these esters lose their stability and decompose when subjected to increased temperature. Advantage is taken of this property to provide additional polymers and decrease contamination of the catalyst by increasing the temperature in the settling zone.

In order to more clearly illustrate the invention and to provide a better understanding thereof reference is had to the attached drawing which is a diagrammatic illustration of a process equipment arrangement used in a preferred embodiment of this invention. Referring to the drawing the alkylation reactions are carried out in a cylindrical elongated contacting vessel 2. The interior of approximately ⅔ of the contactor is divided into a number of separate reaction stages or sections 13, 13a, 13b and 13c by transverse baffles so arranged that liquid entering the end of the contactor passes from an inlet chamber 11 upward through the first section 13 over a baffle down to the bottom of the second section 13a, then upward through the second section over a second baffle and in a similar manner through the third and fourth sections 13b and 13c. Each section contains a mixer 7, 7a, 7b and 7c respectively, in this specific illustration, propeller-type submersible pumps disposed vertically with the drivers located outside and above the contactor and the impellers located in the lower portion of each reaction section. Each pump is so constructed that material entering the suction is forced upward within the pump casing and then downward and out through openings within the casing into the corresponding section. The capacity of each pump is such that the quantity of materials circulated through the pump is several times greater than the total liquid flow entering the section in which the pump is located.

The alkylation reactants and catalyst enter the contactor 2 at three different points. The alkylation feed comprising a mixture of propane, butane, isobutane and butylene is split into four streams which enter the mixing pumps 7, 7a, 7b and 7c through conduits 3, 3a, 3b and 3c respectively. This material passes downward within each pump through a hollow sleeve surrounding the pump shaft and is admitted to the liquid stream flowing through the pump downstream of the pump impeller. A mixture of butane and isobutane made up of compressor condensate material, isobutane separated from the contactor effluent and fresh isobutane is admitted to the inlet chamber 11 of the contactor through conduit 9. The acid catalyst comprising fresh acid or a mixture of fresh acid and contaminated acid is admitted to the bottom of the first reaction section 13 through conduit 43. As illustrated, acid may also be introduced into the succeding sections 13a, 13b and 13c through conduits 43a, 43b and 43c. Hydrocarbon passing from the inlet chamber 11 into the first reaction section 13 is combined with the acid and the mixture enters the suction of the pump 7 where it is picked up, emulsified and directed upward within the pump casing at a high velocity. The alkylation feed from conduit 3 is admitted to the emulsion downstream of the pump impeller and the alkylation reaction proceeds immediately and is substantially completed before the reactants leave the pump casing. As mentioned previously, the capacity of pump 7 is sufficiently great to assume a circulation rate several times as large as the flow of alkylation feed, isobutane and acid into section 13, thus unreacted isobutane is circulated along with the acid catalyst and a portion of the alkylation product through the pump a number of times before it passes into the next section, where another portion is reacted with fresh alkylation feed. The same procedure is repeated in sections 13b and 13c.

Simultaneous with the alkylation reaction a portion of butylene hydrocarbon reacts with itself to form butylene copolymer. Depending on the number of butylene molecules so joined, polymers of varying molecular weight are produced, some of which have densities approaching the density of the sulfuric acid catalyst.

The alkylation contactor 2 is maintained at a temperature of about 35° F. and at a pressure of about 3.5 p. s. i. g. Since the catalyst and hydrocarbon streams normally enter the contactor above 35° F. it is necessary to provide a method of cooling the reactor to remove the sensible heat in these streams. In addition the exothermic nature of the alkylation reaction requires further cooling to remove the heat of reaction and maintain the reaction sections at the required low temperature. In this specific illustration the cooling is accomplished by autorefrigeration of the reactants and reaction products. In carrying out this operation vapors are withdrawn from the contactor through conduit 19 into a dry drum 23. Any materials settling in the dry drum are returned to the contactor separation zone 18 beneath the acid level through conduit 21. The dry gas from drum 23 enters the suction of a compressor (not shown) through conduit 25, is compressed, condensed, passed to a separation system for the removal of propane and the condensate is returned to the contactor in the isobutane recycle through conduit 9.

A substantial amount of the vaporization which occurs in the contactor takes place in the entrance chamber 11 and the reaction sections 13, 13a, 13b and 13c. The isobutane recycle stream enters the contactor as a liquid and at a higher temperature and pressure than that maintained within the contactor. As a result a portion of this stream flashes in the entrance chamber 11. To prevent a mixture of vapor and liquid passing into the suction of pump 7 an outlet for this gaseous material is provided through conduit 5. A similar situation prevails in each of the reaction sections, since, in order to remove the reaction heat from each section, it is necessary that a further amount of light material be vaporized therein. This material is supplied partially by the alkylation feed from conduits 3, 3a, 3b and 3c, which feed is also introduced at a temperature and pressure higher than that maintained in the contactor. Vapor formed in the reaction sections is removed from the contactor through conduits 5a, 5b and 5c, is combined with the vapor from conduit 5, passes into the upper portion of the contactor downstream of the last reaction section and is withdrawn from the contactor through conduit 19. By this method of operation it is possible to maintain a relatively constant temperature throughout the contactor.

The effluent from the last reaction section, comprising a mixture of alkylate, acid, unreacted isobutane, polymers, butane and propane passes through an emulsion breaking zone 15 formed by parallel transverse baffles and containing a conventional inert packing material. All of the effluent from the last section is forced to flow through this zone by a deflector baffle 17 extending above the hydrocarbon level within the contactor and downward within the emulsion breaking zone. Subsequent to this zone the acid hydrocarbon mixture is passed into a separation zone 18 of a size sufficient to provide a hydrocarbon settling time of about 60 minutes. All of the light alkylate and lighter hydrocrabons and a substantial portion of the lighter polymers are separated from the acid in this zone, however, the acid phase leaving zone 18 still contains about 5% of heavy hydrocarbon polymers. The polymer contaminated acid leaves the alkylation contactor through conduit 29 and passes into an acid settler 35 having a volume about ¼ the volume of zone 18, wherein another 90 minutes of acid settling time is provided. To improve the separation of polymer in the settler a temperature rise to about 80° F. is induced in the contaminated acid by circulating hot water through a jacket around the settler (not shown). The result of the temperature increase is two-fold:

(1) It decreases the viscosity of the acid and allows faster separation of polymers and, (2) It promotes decomposition of thermally unstable acid esters thereby increasing polymer yield and further decreasing acid contamination.

The combined effect of increased temperature and added holding time is to release from the acid about 80% of the remaining polymer, which material returns to the separation zone 18 through conduit 33. The substantially polymer-free acid then leaves the acid settler through conduit 37. A portion of this material is introduced into fresh acid through conduit 39 and is returned to the alkylation contactor through conduit 41. The remainder of the acid is either removed for further purification, used in a process requiring an acid of lower purity or is discarded.

The hydrocarbon phase from separation zone 18 passes over baffle 27 and is removed from the contactor through conduit 31 for further processing (not shown).

In this specific illustration of the invention the heavy polymers separated from the acid catalyst are conveniently returned to the contactor acid-hydrocarbon separation zone, however, other methods of disposing of this stream may be used within the scope of the invention. For example, the polymers may be yielded from the unit as a separate stream or they may be combined with heavy alkylate after the heavy alkylate is separated from the total alkylate stream.

The invention described herein has particular utility when incorporated in a sulfuric acid alkylation process. The problem of sulfuric acid contamination and purification has plagued the industry for many years. The method of this invention, by decreasing catalyst contamination and thus overall catalyst consumption, can be an important factor in the economics of the alkylation process.

Having described the invention by reference to a specific application thereof it should be understood that no undue restrictions or limitations are to be imposed by reason thereof but that the scope of the invention is defined by the appended claims.

I claim:

1. In a process for the alkylation of isobutane with butylene in the presence of a sulfuric acid catalyst in which the reactants and acid are contacted in a reaction zone in a turbulent state under conditions suitable to effect the alkylation reaction and the reaction mixture is passed through an emulsion breaking zone into a first settling zone where there is separated a hydrocarbon-rich phase and an acid-rich phase, the improvement which comprises passing substantially all the acid-rich phase to a second settling zone at a higher temperature than said first settling zone in which a further separation of hydrocarbon and acid takes place, returning the hydrocarbons separated in said second settling zone to the first settling zone and recycling at least a part of the acid to the reaction zone.

2. A process which comprises contacting isoparaffin and olefin hydrocarbons in the presence of an acid catalyst in a reaction zone under conditions such that alkylation of the isoparaffins with the olefins and polymerization of the olefins takes place, passing the reaction mixture into a first settling zone where there is separated a hydrocarbon-rich phase containing lighter polymers and an acid-rich phase containing heavier polymers, passing substantially all the acid-rich phase to a second settling zone at a higher temperature than said first settling zone in which the heavier polymers are separated from the acid and returning the heavier polymers to the first settling zone.

3. A process which comprises contacting isobutane and butylene in the presence of a sulfuric acid catalyst in a reaction zone in a turbulent state and under conditions such that alkylation of the isobutane with the butylene and polymerization of the butylene takes place, passing the reaction mixture through an emulsion breaking zone into a first settling zone of sufficient size to provide a holding time of between about 30 and about 60 minutes where there is separated a hydrocarbon-rich phase containing lighter polymers and an acid-rich phase containing heavier polymers, passing substantially all the acid-rich phase to a second settling zone having a volume small in comparison with the volume of the first settling zone and of sufficient size to provide a holding time between about 60 and about 200 minutes where the temperature is allowed to increase and in which the heavier polymers are separated from the acid, returning the heavier polymers to the first settling zone and recycling at least a part of the acid to the reaction zone.

4. In a process for the alkylation of isobutane with butylene in the presence of a sulfuric acid catalyst in which the reactants and acid are contacted in a reaction zone in a turbulent state under condition suitable to effect the alkylation reaction including a temperature of about 35° F. and the reaction mixture is passed through an emulsion breaking zone into a first settling zone where there is separated a hydrocarbon-rich phase and an acid-rich phase, the improvement which comprises passing substantially all the acid-rich phase to a second settling zone where the temperature is allowed to increase to not more than about 90° F. and in which a further separation of hydrocarbon and acid takes place, returning the hydrocarbons separated therein to the first settling zone and recycling at least a part of the acid to the reaction zone.

5. A process which comprises contacting isobutane and butylene in the presence of a sulfuric acid catalyst in a reaction zone in a turbulent state and under conditions including a temperature of about 35° F. such that alkylation of the isobutane with the butylene and polymerization of the butylene takes place, passing the reaction mixture through an emulsion breaking zone into a first settling zone of sufficient size to provide a holding time of between about 30 and about 60 minutes where there is separated a hydrocarbon-rich phase containing lighter polymers and an acid-rich phase, passing substantially all of said acid rich phase to a second settling zone having a volume small in comparison with the volume of the first settling zone and of sufficient size to provide a holding time between about 60 and about 200 minute where the temperature is allowed to increase to not more than about 90° F. and in which the heavier polymers are separated from the acid, returning the heavier polymers to the first settling zone and recycling at least a part of the acid to the reaction zone.

6. In a process for the alkylation of isoparaffins with olefins in the presence of an acid catalyst in which the reactants and acid are contacted in a reaction zone under conditions suitable to effect the alkylation reaction and the reaction product is passed to a first separation zone for separation of a hydrocarbon-rich phase and an acid-rich phase, the improvement which comprises, passing substantially all of said acid-rich phase to a second separation zone, maintaining said acid-rich phase at a reduced viscosity for at least about 60 minutes in said second separation zone to effect separation of additional hydrocarbons from said acid phase, returning the thus separated hydrocarbons to the first separation zone and recycling at least a part of the thus separated acid to the reaction zone.

References Cited in the file of this patent

UNITED STATES PATENTS

| | | |
|---|---|---|
| 2,371,408 | Parker | Mar. 13, 1945 |
| 2,429,965 | Shearer et al. | Oct. 28, 1947 |
| 2,441,249 | Ocon et al. | May 11, 1948 |